March 11, 1930. A. P. MYER 1,750,240
ALTERNATING CURRENT MOTOR
Filed March 14, 1927
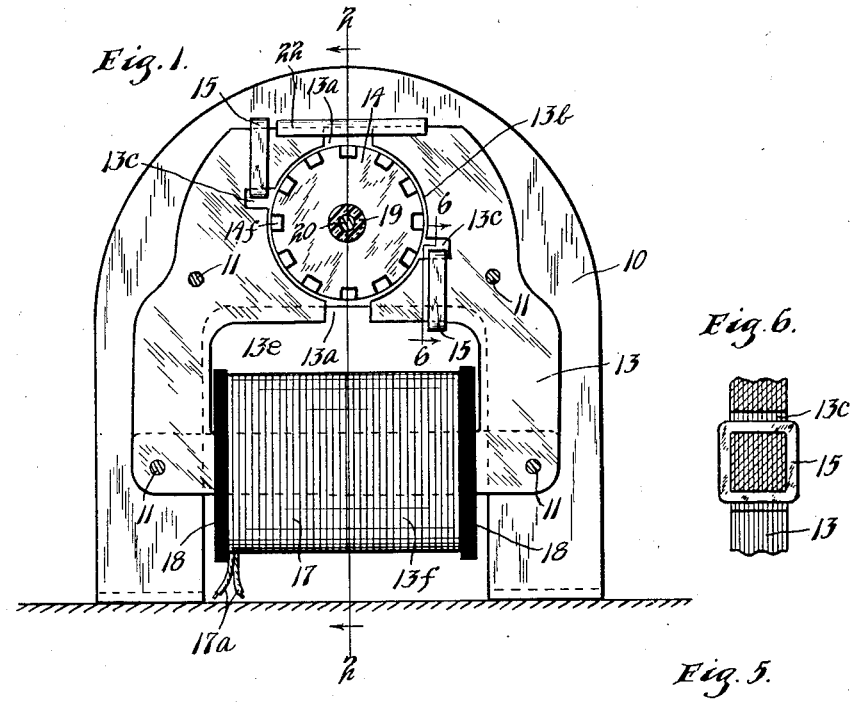
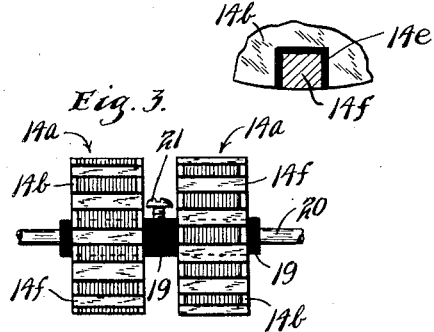
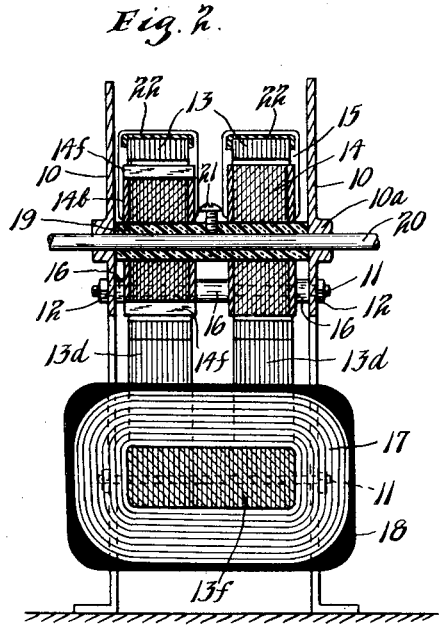
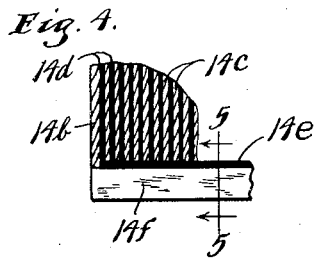
INVENTOR.
ALBERT P. MYER.
BY HIS ATTORNEYS.

Patented Mar. 11, 1930

1,750,240

UNITED STATES PATENT OFFICE

ALBERT P. MYER, OF MINNEAPOLIS, MINNESOTA, ASSIGNOR TO SIMPLEX HEAT REGULATOR COMPANY, OF MINNEAPOLIS, MINNESOTA, A CORPORATION OF MINNESOTA

ALTERNATING-CURRENT MOTOR

Application filed March 14, 1927. Serial No. 175,192.

This invention relates to a motor and while the invention could have various applications, it particularly relates to a small motor of the induction type. The motor may be used in various places, but one use in practice has been in connection with a thermostat regulator for furnaces, the motor being used to operate the furnace controls or dampers. Such a motor should be simple in construction, inexpensive and be one that will readily start from rest when current is applied.

It is an object of this invention, therefore, to provide a simple and efficient construction of induction motor having the rotor in two laterally spaced parts, the field frame and coil for said rotor being connected.

It is a further object of the invention to provide a simple and efficient construction of a rotor for a motor.

It is also an object of the invention to provide an induction motor having one field coil, a divided field frame, spaced rotors, the coils or bars of the rotors being respectively circumferentially staggered.

These and other objects and advantages of the invention will be fully set forth in the following description made in connection with the accompanying drawings, in which like reference characters refer to similar parts throughout the several views and in which:—

Fig. 1 is a view in side elevation of the motor;

Fig. 2 is a vertical section taken on line 2—2 of Fig. 1 as indicated by the arrows;

Fig. 3 is a view in side elevation of the rotor removed from the machine;

Fig. 4 is a partial sectional view of the rotor such as shown in Fig. 2, the same being shown on an enlarged scale;

Fig. 5 is a vertical section taken on line 5—5 of Fig. 4, as indicated by the arrows; and Fig. 6 is a vertical section taken on line 6—6 of Fig. 1 as indicated by the arrows.

Referring to the drawings, a motor is shown comprising a frame having side plates 10 which are spaced and said plates are connected and held in relative rigid position by the tie rods 11 receiving the clamping bolts 12. The field frame 13 of the motor is disposed between the frame pieces 10, said field frame being made up of quite a large number of thin plates so as to be of laminated construction as indicated in Fig. 2 and 6. The field frame 13 is divided at its upper portion by the slots 13$^a$ and has semi-cylindrical portions 13$^b$ forming a substantially cylindrical recess or chamber in which the rotor 14 is disposed, said upper portions at each side of said rotor forming the pole pieces. The field frame 13 is also provided with recesses 13$^c$ and shading rings 15 are provided passing through said recesses and around one side of said field frame. It will be seen in Fig. 2 that the field frame comprises two portions 13$^d$ being held in properly spaced relation by the spacing members 16 on the rods 11. The lower portion of the field frame has a recess 13$^e$ therein forming a lower straight portion 13$^f$ on the frame. The portion 13$^f$ is not divided into the portion 13$^d$ but is formed of one body of laminated plates. The coil 17 is wound about the portion 13$^f$ of the field frame, said coil being disposed between end plates 18 of insulating material and having the terminals 17$^a$ leading therefrom.

The armature 14 is also divided into two laterally spaced parts 14$^a$ which are respectively alined with the portions 13$^d$ of the field frame. Each section 14$^a$ comprises side plates 14$^b$ between which are a plurality of thin iron or steel plates 14$^c$ separated by insulating plates 14$^d$. The plates 14$^b$, 14$^c$ and 14$^d$ are provided with a plurality of circumferentially spaced slots in their peripheries, in which are disposed the insulating members 14$^e$ extending about the walls of said slots in plates 14$^c$ and 14$^d$ and bars 14$^f$ of copper, brass or other good conducting metal are disposed within the insulating members 14$^e$, said bars extending to and being electrically connected to the side plates 14ᵇ. As shown in Fig. 3, the bars 14ᶠ on one section 14ᵃ are disposed opposite the spaces between the bars on the other section 14ᵃ. The latter sections 14ᵃ are mounted upon a bushing of insulating material 19, held on the shaft 20 by any suitable means such as the set screw 21 and said shaft 20 is journaled in bosses 10ᵃ on the side frame plates 10. The shaft 20 will carry a suitable belt or gearing for operating the devices which are to be actuated from the motor. Cover plates 22 are provided, seated upon the top of the field frame 13 and extending across the top of the slots 13ᵃ.

In operation alternating current will be supplied to the conductors 17ᵃ and to the coil 17, the rotors comprising the side plates 14ᵇ and the cross bars 14ᶠ constituting a squirrel cage construction and the rotor is thus revolved in the ordinary manner of an induction motor. The motor is simple and efficient in construction and well adapted for use as a thermostatically operated motor for controlling a furnace. The spaced field portions 13ᵈ and the spaced rotor sections 14ᵃ give good ventilation so that the motor is not unduly heated. The bars 14ᶠ being staggered in the two sections 14ᵃ, cause the rotor to revolve with a more uniform rotation.

From the above description it is seen that applicant has provided a very simple and efficient form of small induction motor. The parts are few and the device is easily made and assembled. The same has been demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. An alternating current motor comprising a frame member having a lower portion, a field coil on said portion, said frame being divided above said coil into laterally spaced sections, each having spaced upper portions comprising spaced pole pieces and a rotor disposed between said pole pieces also having laterally spaced and similarly constructed sections substantially alined with said sections of said field frame and spaced the same distance from said pole pieces.

2. An alternating current motor comprising a field frame having laterally spaced sections divided at their upper portion to form oppositely disposed pole pieces, said sections being connected at their lower portion, a field coil wound about said connected lower portion, a rotor disposed between said pole pieces and comprising laterally spaced relatively fixed sections substantially alined with the sections of said field frame, and spaced the same distance therefrom, said sections each having side plates with bars set in the edges thereof and extending therebetween forming a squirrel cage structure, and a laminated body between said plates, said bars in one section being staggered with respect to the bars in the other section.

In testimony whereof I affix my signature.

ALBERT P. MYER.